United States Patent
Sloan

(10) Patent No.: US 7,427,317 B2
(45) Date of Patent: Sep. 23, 2008

(54) HIGH ELONGATION VACUUM FORMABLE DIGITAL INK

(76) Inventor: Donald D. Sloan, 17750 Elm Grove Rd., Platte City, MO (US) 64079

( * ) Notice: Subject to any disclaimer, the term of this patent is extended or adjusted under 35 U.S.C. 154(b) by 112 days.

(21) Appl. No.: 11/387,674

(22) Filed: Mar. 23, 2006

(65) Prior Publication Data

US 2006/0275588 A1    Dec. 7, 2006

Related U.S. Application Data

(63) Continuation-in-part of application No. 11/346,932, filed on Feb. 3, 2006.

(60) Provisional application No. 60/666,926, filed on Mar. 31, 2005.

(51) Int. Cl.
| | |
|---|---|
| C09D 11/00 | (2006.01) |
| C09D 11/02 | (2006.01) |
| C09D 11/10 | (2006.01) |
| C09D 4/00 | (2006.01) |
| C08F 2/46 | (2006.01) |
| C08J 3/28 | (2006.01) |

(52) U.S. Cl. ............. 106/31.13; 106/31.6; 106/31.65; 106/31.85; 106/31.86; 522/71; 522/74; 522/81; 522/150; 522/153; 522/178; 522/182; 427/508; 427/511; 427/514; 427/551; 427/372.2; 427/374.4; 427/384; 427/385.5

(58) Field of Classification Search ............. 106/31.13, 106/31.6, 31.65, 31.85, 31.86; 522/71, 74, 522/81, 150, 153, 178, 182; 427/508, 511, 427/514, 551, 372.2, 374.4, 384, 385.5

See application file for complete search history.

(56) References Cited

U.S. PATENT DOCUMENTS

| 4,348,427 A | 9/1982 | Priola et al. |
|---|---|---|
| 4,424,314 A | 1/1984 | Barzynski et al. |
| 4,994,347 A | 2/1991 | Smothers |
| 5,280,305 A | 1/1994 | Monroe et al. ............. 346/107 |
| 5,395,863 A | 3/1995 | Burns et al. |
| 5,895,624 A | 4/1999 | Reece et al. ............... 264/554 |
| 6,023,872 A | 2/2000 | Falkenstein, Sr. |
| 6,326,419 B1 | 12/2001 | Smith ......................... 523/160 |
| 6,423,173 B1 | 7/2002 | Wexler ....................... 156/227 |
| 6,550,905 B1 * | 4/2003 | Deckers ..................... 347/100 |
| 6,627,677 B2 | 9/2003 | Smith ......................... 523/160 |
| 6,796,650 B2 | 9/2004 | Brignone et al. ............ 347/105 |
| 7,304,095 B2 * | 12/2007 | Masumi et al. .............. 522/81 |
| 2003/0158283 A1 | 8/2003 | Ylitalo et al. ................. 522/74 |
| 2003/0202082 A1 * | 10/2003 | Takabayashi ............... 347/105 |
| 2004/0198868 A1 | 10/2004 | Tielemans et al. .......... 523/161 |
| 2004/0241578 A1 | 12/2004 | Hirai ....................... 430/270.1 |
| 2005/0069682 A1 | 3/2005 | Tseng ..................... 428/195.1 |
| 2005/0074681 A1 | 4/2005 | Iwase et al. ..................... 430/9 |

FOREIGN PATENT DOCUMENTS

| JP | 01-190712 | 7/1989 |
|---|---|---|
| JP | 2812580 | 10/1998 |
| JP | 2880845 | 4/1999 |

OTHER PUBLICATIONS

RAHN: Energy Curing. Product Guide. [online], [retrieved on Jan. 18, 2008]. Retrieved from interntet<URL: http://www.rahn-group.com/file_uploads/bibliothek/k_51_EnergyCuring/k_52_DocumentsNewsletters/1532_9_0_ProductGuideA4internet.pdf>.*

* cited by examiner

*Primary Examiner*—Sanza L McClendon
(74) *Attorney, Agent, or Firm*—Hovey Williams LLP

(57) ABSTRACT

The present invention includes a curable ink composition for digitally printing onto plastic substrates and three dimensional objects comprising an ink composition comprising a pigment, an acrylic polymer or copolymer having an acid number below about 20 component, a diluent, additives and a mono-functional monomer. The mono-functional monomer may be an aromatic monoacrylate.

37 Claims, No Drawings

HIGH ELONGATION VACUUM FORMABLE DIGITAL INK

CROSS REFERENCE TO RELATED APPLICATIONS

The present application is based on and claims the benefit of U.S. provisional patent application Ser. No. 60/666,926, filed Mar. 31, 2005, the content of which is hereby incorporated by reference in its entirety.

The present application is a continuation-in-part of and claims priority of U.S. patent application Ser. No. 11,346,932, filed Feb. 3, 2006, the content of which is hereby incorporated by reference in its entirety.

BACKGROUND OF THE INVENTION

The present invention generally relates to a curable inkjet ink composition for use in digital printing. More specifically, the present invention relates to a curable inkjet ink composition containing an ink composition formulated with a mono-functional monomer that can be directly printed onto a plastic substrate. The mono-functional monomer enables the ink composition to undergo continuous elongation during thermal processing of the plastic substrate. The present invention further includes methods of forming the curable inkjet ink composition and methods of using the curable inkjet ink composition.

Inkjet imaging techniques have become very popular in commercial and consumer applications. Ink jet printers typically operate by ejecting ink onto a receiving substrate in controlled patterns of closely spaced ink droplets. By selectively regulating the pattern of ink droplets, ink jet printers can produce a wide variety of printed features, including text, graphics, images, holograms, and the like. Moreover, ink jet printers are capable of forming printed features on a wide variety of substrates, as well as three-dimensional objects in applications such as rapid prototyping.

Thermal ink jet printers and piezo inkjet printers are the two main types of ink jet systems in widespread use today. For both approaches, inks must meet stringent performance requirements in order for the inks to be appropriately jettable and for the resultant printed features to have the desired mechanical, chemical, visual, and durability characteristics.

Solvent-based and water-based jettable inks are well known A typical water-based ink generally comprises water, a colorant, which may be a dye and/or a pigment, one or more co-solvents, and one or more additives that are included to enhance the performance of the ink. Representative examples of such additives include one or more colorants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Solvent-based inks include relatively volatile, inorganic solvents. Such inks dry more rapidly and easily than aqueous inks. However, such solvents may be toxic, flammable, or the like, requiring careful handling. In addition, the solvent-based inks also tend to be compatible with only a limited range of substrates.

In order to avoid using a conventional solvent, inks incorporating a polymerizable diluent have been developed. The diluent not only functions as a solvent, but also functions as a viscosity reducer, as a binder when cured, and optionally as a cross-linking agent. In the uncured state, the inks have a low viscosity and are readily jetted. However, the polymerizable diluents readily crosslink upon exposure to a suitable source of curing energy, for example ultraviolet light, electron beam energy, and/or the like, to form a cross-linked polymer network.

Inkjet inks are typically limited to digitally printing onto flat sheet constructions, such as papers, plastics, banner materials and the like. For plastic substrates or three-dimensional plastic constructions, screen printing was the preferred method since digital printing of inkjet inks onto plastic substrates produced images that cracked or could not elongate under thermal conditions. Therefore, the ability to digitally print directly onto plastic substrates using inkjet printing systems to form ink images capable of continual elongation during thermal processing presently exists.

SUMMARY OF THE INVENTION

The present invention includes an ink composition for digitally printing onto plastic substrates and three dimensional objects that includes an ink composition containing a pigment, a diluent, an acrylic polymer or copolymer having an acid number ranging below about 20 and preferably between about 1 and 20 and a mono-functional monomer. The mono-functional monomer is preferably an aromatic monoacrylate.

The present invention also includes an inkjet printing system utilizing such an ink composition in an inkjet printer wherein the ink composition is capable of being cured by UV energy or LED energy.

The present invention also includes a method of forming such an ink composition wherein the ink composition includes a pigment, a diluent, an acrylic polymer or copolymer having an acid number ranging between about 1 and 20 and a mono-functional monomer.

DETAILED DESCRIPTION

The present invention includes an ink composition for use in digital printing an ink image directly onto a plastic substrate. The ink composition includes an acrylic polymer or copolymer with an acid number ranging below about 20 and preferably between about 1 and 20. By copolymer is meant a polymer comprised of different monomeric units. It has been found that stability, functionality and adhesion of the ink composition is largely attributable to the acid number of the acrylic polymer or copolymer used herein. Using an acrylic polymer or copolymer having an acid number below about 20 and preferably within the range of about 1 through 20 has been found to have a profound effect on the ink composition's stability. Such acrylic polymers or copolymers may include ethyl methacrylate, methyl methacrylate, butyl methacrylate or copolymers thereof in any combination. Suitable polymers and copolymers having the designations and acid numbers MB-7022 (acid # 0), MB-2588 (acid # 15), Br-15 (acid # 0), MB-2543 (acid # 3), BR-220 (acid # 9), MB-2823 (Acid #0) and MB-2594 acid # 6) may be obtained from Dianal America Inc of Pasadena, Tex. By stability is meant to keep both the ink and/or pigment in suspension with no settling or separation in the remainder of the composition. Utilizing the acid number below about 20 and preferably within a range of about 1 through 20 is also believed to help maintain and control the viscosity of the system, wetting of the pigment particles, as well as wetting out of the composition onto the substrate which is being printed.

By acid number it is meant the weight in milligrams of potassium hydroxide required to neutralize the pendant carboxylate groups in one gram of polymer. The procedure for determining acid numbers is described in ASTM D 974 and D 604.

One useful acrylic polymer for use in the ink composition of the present invention is a low viscosity aromatic monoacrylate sold under the designation CN 131 by Sartomer Company, Inc. of Exton, Pa.

The curable ink composition also includes a mono-functional monomer, such as 2-phenoxyethyl acrylate, isobornyl acrylate, ethyl methacrylate, butyl methacrylate, methyl methylacrylate, or any combination of any of these. The mono-functional monomer helps the ink image to adhere to the surface of the plastic substrate after printing and curing. The mono-functional monomer has a molecular weight that ranges from about 100 g/mole to about 600 g/mole.

The resulting acrylate polymer have a molecular weight from 2500 g/mole to about 15000 g/mole but could have a molecular weight as high as 25000 g/mole.

When the curable ink composition cures from a liquid state to a solid state, the mono-functional monomer enables the curable ink composition to form a (1) chemical bond, (2) mechanical bond, or (3) combination of a chemical and mechanical bond with the plastic substrate. As a result, the ink image can undergo elongation of 100% to 900% during thermal processing of the plastic substrate. In addition, the digitally printed ink image does not crack, have voids, faults, and separations or undergo other types of distortion during thermal processing of the plastic substrate. Ink images printed with the ink composition of the present invention also have excellent exterior durability.

As used herein, the term "curable" refers to an ability of a material to polymerize, harden, and/or cross link in response to a chemical additive, or a source of curable energy such as ultraviolet (UV) energy, light emitting diode (LED) energy, electron beam energy, heat energy, or other source of energy. By thermally processed is meant vacuum formed, heat-bent, heat folded, or other thermal processing technique.

As used herein, the term "mono-functional monomer" (as opposed to "bi-functional monomers", "di-functional monomers" and/or "multifunctional monomers") refers to a molecule containing one polymerizable functional group per molecule.

Some non-exhaustive examples of suitable mono-functional monomers that can be used to practice the present invention include 2-phenoxyethylacrylate, isobornyl acrylate, methyl methacrylate, ethyl methacrylate, butyl methacrylate or any combination of any of these.

The mono-functional monomer may be supplied in granular, or liquid, as long as the selected form allows the mono-functional monomer to be homogeneously mixed into the curable ink composition during preparation. For example, the mono-functional monomer is in the form of a liquid in solution with an acrylic polymer when forming a curable ink composition that is cured by UV and LED energy in accordance with the present invention. Additionally, the mono-functional monomer may be supplied as individual mono-functional monomers, or supplied in various prepared mixtures of two or more mono-functional monomers that are subsequently combined and used to practice the present invention.

Though descriptions of the present invention are primarily made in terms of the preferred mono-functional monomer that includes at least one mono-functional acrylate, it is to be understood that any other mono-functional monomers, may be substituted in place of the mono-functional acrylate(s) in accordance with the present invention while still realizing benefits of the present invention. Likewise, it is to be understood that any combination of any mono-functional acrylate and any other mono-functional monomer may be used in accordance with the present invention, while still realizing the benefits of the present invention.

The mono-functional monomer that is used in accordance with the present invention is an amount that is effective in forming a (1) chemical bond, (2) mechanical bond or (3) combination of a chemical and mechanical bond between the curable ink composition and the plastic substrate. Furthermore, the amount of the mono-functional monomer may vary, depending upon the molecular weight of the oligomer, the pigment of the mixing conditions, any additives, and the desired flow, viscosity, wetting ability, compatibility and curing rate of the curable ink composition The amount of the mono-functional monomer may also vary based upon the desired durability, flexibility, elasticity, gloss, hardness, chemical resistance, stiffness, and/or desired elongation characteristics of the curable ink composition. The concentration of the mono-functional ranges from about 15 up to about 85 weight percent, based on the total weight of the curable ink composition, when practicing the present invention.

When forming a curable ink composition that is cured by LED energy or UV energy, the curable ink composition generally includes a pigment, a diluent, an oligomer, a photoinitiator, and other optional additives in addition to the thermal elongation factor. At least one pigment is typically dispersed in a carrier vehicle to impart color to the curable ink composition.

As used herein, the term "pigment" refers to an insoluble colorant or solid colorant particles that remain suspended or dispersed when introduced into a carrier fluid or solvent. Furthermore, it is to be understood that the term "pigment" is not meant to encompass a dye or water-soluble colorant containing particles that are fully dissolved in the carrier fluid or solvent.

The pigment used to practice the present invention may be supplied in granular, or liquid. Additionally, the pigment may be dispersed into the curable ink composition using any of the known methods that produces a pigment particle size of about 0.5 micron to about 1.5 microns.

The pigment used in this invention may also be supplied as a dispersion. Suitable dispersions are mentioned in the Examples. Dispersion includes a pigment, a monomer, and a dispersant to disperse the pigment. Occasionally an oligomeric material may also be included in the dispersion to hold the pigment in suspension.

In another example, the pigment having pigment particle sizes ranging from about 0.5 micron to about 1.5 microns may be added to the curable ink composition in a dispersed form. Furthermore, the pigment may be supplied as individual pigments, or supplied in various solid levels predispersed in monofunctional acrylate systems. These pigments solutions may be dispersed in a variety of pigment colors.

Some non-exhaustive examples of suitable pigments include Elftex 12 (carbon black) that is available from Cabot Corporation; Blue NGA (blue pigment) that is available from Ciba-Geigy, Cromophtal Yellow 3G (yellow pigment 93) that is available from Ciba-Geigy; Rhodamine YS (pigment red 81) that is available from SunChemical; and Quinacridone Magenta (pigment red 122) that is available from SunChemical; and, any combination of these.

The pigment that is used in accordance with the present invention is an amount that is effective to (1) maximize the curing rate of the curable ink composition, (2) impart the desired color to the curable ink composition and final printed ink image (3) obtain the desired wetting ability, and/or (4) enhance receptivity to UV or LED energy.

Additionally, the amount of the pigment may vary, depending upon the type of mono-functional monomer; the oligomer, the mixing conditions, any additives, and the desired flow, viscosity, and adhesion of the cured ink composition to the plastic substrate, desired durability, flexibility, elasticity, gloss, hardness, chemical resistance, stiffness, desired elongation characteristics and any combination of any of these. When the pigment is white, the concentration of the pigment typically ranges from about 0 to 40 weight percent, based on the total weight of the curable ink composition when the pigment is white. When the pigment is a color, the pigment concentration typically ranges from about 10 to about 15 weight percent, based on the total weight of the curable ink composition.

The curable ink composition further includes a diluent that is used to modify the viscosity of the curable ink composition. The diluent generally includes one or more monomer(s) that contain two or more functional polymerizable groups per molecule. As used herein, the term "monomer" refers to a molecule once reacted becomes a repeating unit of a polymer and that has a molecular weight that is less than about 1500 g per mole. As an example, the monomer(s) includes two or more functional polymerizable groups per molecule and a molecular weight that ranges from about 500 g per mole to about 1500 g per mole. An example of a monomer that can be used in the present invention includes vinylprrolidone.

The curable ink composition may also include an oligomer that is effective to (1) control viscosity control, (2) reduce shrinkage, (3) enhance durability, (4) enhance flexibility, (5) control adhesion of the cured ink composition to the plastic substrate, and/or (6) control wetting ability. The oligomer generally includes two or more monomers having one or more functional polymerizable group(s).

As used herein, the term "oligomer" refers to two or more reacted monomers that have collectively a molecular weight of more than about 10,000 g/mole. Furthermore, it is to be understood that the term "oligomer" refers to both reacted monomeric chains that are capable of further reaction and polymers that are considered to have no further substantial reactivity and that the oligomer has a molecular weight of more than about 10,000 g/mole.

Some non-exhaustive examples of oligomer(s) that can be used in the present invention include polyurethanes, acrylic materials, polyesters, polyimides, polyamides, epoxies, polystyrene, styrene and substituted styrene containing materials, silicone containing materials, fluorinated materials, combinations of these, and the like. For example, dianyl acrylic polymer may be used as the oligomer when practicing the present invention.

Preferably, the curable ink composition includes an additive in the form of a photo-initiator. As used herein, the term "photo-initiator" is a compound that absorbs light energy and is responsible for the production of free radicals in a free radical polymerized system.

In general, the type and amount of photo-initiator that is used in the present invention may vary depending on the radiation or energy source, the curable ink composition thickness, the pigment, the thermal elongation factor, the diluent, the oligomer, and the desired curing rate. UV curable photo initiators cure between the spectral output range of about 260 to about 320 nanometers. The LED curable photo-initiators cure between the spectral output range of about 250 to about 410 nanometers.

Some non-exhaustive examples of photo-initiators that are suitable for use when practicing the present invention include ITX (2, isopropylthiaoxanthone), Irgacure 184 (1-benzoyl-1-hydroxycyclohexane), TPO (2,4,6 trimethylbenzoylphenylphosphineoxide); benzoin ethers, such as benzoin isopropyl ether, benzil dimethyl ketal (commercially available under the trade designation "IRGACURE 651" from Ciba-Geigy of Ardsley, N.Y.); 2-methyl-1-[4-(methylthio)phenyl]-2-(4-morpholinyl)-1-propanone commercially available under the trade designation "IRGACURE 907", also from Ciba-Geigy Corp.); and 2-benzyl-2-(dimethylamino)-1-[4-(4-morpholinyl)phenyl]-1-butanone (commercially available under the trade designation "IRGACURE 369", also from Ciba-Geigy Corp.); mono- and bis-acylphosphines, such as those available from Ciba-Geigy under the trade designations "IRGACURE 1700," "IRGACURE 1800," "IRGACURE 1850," "IRGACURE 184," (hydroxy-ketone) "DAROCUR 4265," "DAROCUR 1173," and the like.

Typically, the curable ink composition includes from about 1.0 to about 8 percent by weight of the photo-initiator. As an example, the photo-initiator includes a concentration ranging from about 1 to about 3 weight percent, based on the total weight of the curable ink composition.

The curable ink composition may further include one or more optional additives when practicing the present invention. These optional additives include one or more of solvents, antifoaming agents, flow or other rheology control agents, oils, plasticizers, binders, antioxidants, photo-initiator stabilizers, fungicides, bactericides, organic and/or inorganic filler particles, leveling agents, opacifiers, antistatic agents, dispersants, and any combination of any of these.

The curable ink composition can be prepared by homogeneously mixing the mono-functional monomers and diluent together. Next, the oligomer is added while mixing to form a viscous intermediate. Any optional additives are subsequently blended into the viscous intermediate with continuous mixing to form an uncolored curable intermediate. Finally, the pigment is added to form the curable ink composition. If the curable ink composition is to be cured using ultraviolet light energy or LED energy, then the photo-initiator is added when the additives are blended into the mixture. The curable ink composition typically has a viscosity that ranges from about 20 to 60 centipoise at a temperature of about 25° C. when practicing the present invention.

The curable ink composition may be applied or printed to a surface of any plastic substrate, such as substrates derived from acrylonitrile butadiene styrene (ABS), styrenes, polystyrenes, cast acrylics, extruded acrylics, polycarbonates, polyethylenes, polypropylenes, polyesters, co-extruded polyesters, glycolised polyester (PETG), amorphous polyethylene terephthalate (APET), rigid vinyls, polyvinyl chlorides or any combination of any of these.

In general, the curable ink composition is digitally printed onto the surface of the plastic substrate when practicing the present invention using an inkjet printer that contains an ink reservoir that houses the curable ink composition. Digital UV printing generally occurs by printing the ink composition through at least one inkjet head having a temperature of about 120 to 160° F. and firing through nozzles having openings between 27 and 52 microns in size. However, other application techniques are also acceptable for applying the curable ink composition to the plastic substrate, such as ink jetting, screen printing, spraying, gravure coating, knife coating, brushing, curtain coating, flexography and the like.

During printing, the curable ink composition is deposited or printed onto a surface of a plastic substrate. After printing, the curable ink composition is cured by ultraviolet (UV) or light emitting diode (LED). The process of curing is effective to form (1) a chemical bond, (2) a mechanical bond, or (3) any combination of a chemical or mechanical bond between the ink composition and the plastic substrate. Furthermore, the mono-functional monomer aids the formation of a bond between the ink composition and the plastic substrate and may be characterized as adhering the ink composition to the plastic substrate.

The amount of curing energy to be used for curing depends upon a number of factors, such as the amount and the type of reactants involved, the energy source, the web speed (if cured on web), the distance from the energy source, and the thickness of the material to be cured. Generally, the rate of curing tends to increase with increased energy intensity. The rate of curing also may tend to increase with increasing amounts of catalyst and/or initiator present in the curable composition.

In general, UV or LED energy is used to cure the curable ink composition when practicing the present invention. Exposure times may be from less than about 1 second up to about 10 minutes or more. Radiation exposure may occur in air or in an inert atmosphere, such as nitrogen.

As noted, curing and properly drying the curable inkjet ink composition forms an ink image on the plastic substrate that elongates to a range that is 100% to 900% of the original ink size. Once the curable inkjet ink composition is cured, the ink image is characterized as being thermoplastic since the ink image and the plastic substrate are bonded to each other. Furthermore, the combination of the cured ink image and the plastic substrate allows thermal heating of the plastic substrate until the plastic substrate is molten and can be fabricated or formed using vacuum-forming equipment, heat-bending equipment, heat-folding equipment or any other equipment that allows forming a plastic substrate into a three dimensional object.

In addition, during the thermal forming process, the ink image continuously elongates or stretches at the same rate as the plastic material to create a three-dimensional product with digitally printed graphics. Furthermore, the printed ink image maintains the uniformity of the ink characteristics by not undergoing cracking, void formation, separation even the plastic substrate undergoes thermal processing.

Commercially available digital printing inkjet inks do not have thermal elongation properties formulated into their inkjet ink compositions. Prior to development of curable inkjet ink compositions having thermal elongation properties, three dimensional plastic products were made using screen printing techniques as screen printing inks were the only commercially available inks having continuous thermal elongation properties.

On the other hand, the curable ink compositions of the present invention, after printing and curing, include thermal elongation properties as part of the ink composition. As a result, curable ink compositions having thermal elongation properties is believed capable of creating a new market for the digital printing industry since digitally printed constructions derived from plastic substrates can now be vacuum formed, heat-bent, heat-folded.

Therefore, use of the curable inkjet ink composition of the present invention enables (1) use of digital printing equipment to produce digitally printed plastic items, (2) cost reduction when producing prototypes or smaller volume runs, (3) withstanding total water immersion, and/or (4) digital inkjet print production of three-dimensional plastic objects that is more cost effective than conventional techniques. In addition, digital printing is known to offer enhanced definition and resolution of graphics when compared to screening printing. Therefore, digital printing onto plastic substrates is now possible with the curable ink composition of the present invention.

The present invention is more particularly described in the following examples which are intended for illustrative purposes only and are not to limit the present invention in any way.

EXAMPLE 1

In this Example a UV curable ink having the following formulation was made:

| 20.50% | IBOA (isobornyl acrylate) |
| 23.50% | 2-PEA (2-phenoxyethyl acrylate) |
| 26.00% | V-Pyrol (Vinyl Pyrrolidone) |
| 30.00% | Dianyl Acrylic Polymer #7165 |

Approximately 17.50% of isobornyl acrylate (SR506 from Sartomer Company of France) is mixed with approximately 23.50% and 26.00% of V-Pyrol (from ISP Chemicals of Wayne, N.J.). This mixture is continuously stirred while adding 30.00% of dianyl acrylic polymer #7165 from Dianal America, Inc. of Pasadena, Tex. Next, 3.00% of DBE (dibasic ester) is added to the mixture to form an uncolored varnish. Next, pigment is added to the uncolored varnish to form the curable ink composition. The pigment includes particle sizes that range from 0.5 to 1.5 microns.

The resulting ink was able to successfully print through digital printing equipment having nozzles with openings between 27 and 52 microns in size.

EXAMPLE 2

In this Example a UV curable ink having the following formulation was made:

| 17.50% | IBOA (isobornyl acrylate) |
| 23.50% | 2-PEA (2-phenoxyethyl acrylate) |
| 26.00% | V-Pyrol (Vinyl Pyrrolidone) |
| 30.00% | Dianyl Acrylic Polymer # TB-0017 |
| 03.00% | DBE (dibasic ester) |

Approximately 17.50% of isobornyl acrylate (SR506) mixed with approximately 23.50% and 26.00% of V-Pyrol. This mixture is continuously stirred while adding 30.00% of dianyl acrylic polymer #TB-0017. Next, 3.00% of DBE (dibasic ester) is added to the mixture to form an uncolored varnish. Next, pigment is added to the uncolored varnish to form the curable ink composition. The pigment includes particle sizes that range from 0.5 to 1.5 microns.

The resulting ink was able to successfully print through digital printing equipment having nozzles with openings between 27 and 52 microns in size.

EXAMPLE 3

In this Example a UV curable ink having the following formulation was made:

| 17.50% | IBOA (isobornyl acrylate) |
| 23.50% | 2-PEA (2-phenoxyethyl acrylate) |
| 26.00% | V-Pyrol (vinyl pyrrolidone) |
| 30.00% | Dianyl Acrylic Polymer #7165 |
| 03.00% | DBE (dibasic ester) |

Approximately 17.50% of isobornyl acrylate (SR506) is mixed with approximately 23.50% and 26.00% of V-Pyrol (n-vinyl pyrrolidone from ISP Chemicals Inc. of Wayne, N.J.). This mixture is continuously stirred while adding 30.00% of dianyl acrylic polymer #TB-0017. Next, 3.00% of DBE (dibasic ester) is added to the mixture to form an uncolored varnish. Next, pigment is added to the uncolored varnish to form the curable ink composition. The pigment includes particle sizes that range from 0.5 to 1.5 microns.

The resulting ink was able to successfully print through digital printing equipment having nozzles with openings between 27 and 52 microns in size.

EXAMPLE 4

In this Example a UV curable ink having the following formulation was made:

| | |
|---|---|
| 17.50% | IBOA (isobornyl acrylate) |
| 23.50% | 2-PEA (2-phenoxyethyl acrylate) |
| 26.00% | V-Pyrol (vinyl pyrrolidone) |
| 30.00% | Dianyl Acrylic Polymer # TB-0017 |
| 03.00% | DBE (dibasic ester) |

Approximately 17.50% of isobornyl acrylate (SR506) is mixed with approximately 23.50% and 26.00% of V-Pyrol. This mixture is continuously stirred while adding 30.00% of dianyl acrylic polymer #TB-0017. Next, 3.00% of DBE (dibasic ester) is added to the mixture to form an uncolored varnish. Next, pigment is added to the uncolored varnish to form the curable ink composition. The pigment includes particle sizes that range from 0.5 to 1.5 microns.

The resulting ink was able to successfully print through digital printing equipment having nozzles with openings between 27 and 52 microns in size.

EXAMPLE 5

In this Example a solvent based ink having the following formulation was made:

| | |
|---|---|
| 39.70% | EEP Solvent (ethyl 3, ethoxy propionate) |
| 17.00% | Cyclohexanone |
| 26.00% | Diacetone alcohol |
| 00.50% | G-60 Plasticizer |
| 04.00% | Butyrate CAB-551-02 |
| 26.00% | Dianyl Acrylic Polymer # TB-0017 |

Approximately 39.70% of EEP solvent (ethyl 3, ethoxy propionate), 17.00% cyclohexanone, 26.00% diacetone alcohol, 0.50% G-60 plasticizer (CP Hall Company of Chicago, Ill.) are mixed together. This mixture is continuously stirred while adding 4.00% cellulose acetate butyrate CAB-551-02 (from Eastman Chemical Company of Kingsport, Tenn.) and 26.00% dianyl acrylic polymer #TB-0017 to form an uncolored varnish. Next, pigment is added to the uncolored varnish to form the curable ink composition. The pigment includes particle sizes that range from 0.5 to 1.5 microns.

The resulting ink was able to successfully print through digital printing equipment having nozzles with openings between 27 and 52 microns in size.

EXAMPLE 6

In this Example a solvent based ink having the following formulation was made:

| | |
|---|---|
| 39.70% | EEP Solvent (ethyl 3, ethoxy propionate) |
| 17.00% | Cyclohexanone |
| 26.00% | Diacetone alcohol |
| 00.50% | G-60 Plasticizer |
| 04.00% | Butyrate CAB-551-02 |
| 26.00% | Dianyl Acrylic Polymer #7165 |

Approximately 39.70% of EEP solvent (ethyl 3, ethoxy propionate), 17.00% cyclohexanone, 26.00% diacetone alcohol, 0.50% G-60 plasticizer are mixed together. This mixture is continuously stirred while adding 4.00% butyrate CAB-551-02 and 26.00% dianyl acrylic polymer #7165 to form an uncolored varnish. Next, pigment is added to the uncolored varnish to form the curable ink composition. The pigment includes particle sizes that range from 0.5 to 1.5 microns.

The resulting ink was able to successfully print through digital printing equipment having nozzles with openings between 27 and 52 microns in size.

EXAMPLE 7

In this Example a UV curable ink having the following formulation was made:

| | |
|---|---|
| 10.00% | Dibasic Ester/Solvent |
| 29.30% | M-8200/2-Phenoxyethyl Acrylate[1] |
| 18.00% | M-8130/Isobornyl Acrylate[1] |
| 01.30% | First cure ST-I Polymerization Inhibitor[2] |
| 13.00% | CPR-9000 Styrene Acrylate Copolymer[3] |
| 04.00% | ESA Cure KTO-46 Photoiniator[1] |
| 14.00% | Photoiniator Solution[4] |
| 09.00% | Blue Pigment Dispersion |
| 00.80% | Cognis 3250 Additive[5] |
| 00.60% | Tego 2250 Additive[6] |
| 100.00% | |

[1]From Sartomer Company, Inc. of Exton, Pennsylvania.
[2]From Albemarle Corporation of Baton Rouge, Louisiana.
[3]From Eliokem of France.
[4]Photoiniator Solution is made by mixing 38 parts of Darocur ® 1173 from Ciba Specialty Chemicals Corporation of Basil, Switzerland is mixed with 13 lbs. of Irgacure ® 369 and 17 lbs. or Irgacure ® 184 (both from Ciba Specialty Chemicals) along with 14 parts of Firstcure ® EDAB and 17 parts of Firstcure ® ITX (both from Albemarle Corporation of Baton Rouge, Louisiana). The mixture is heated to 240° F. or until all the initiators have dissolved.
[5]From Cognis of Germany.
[6]From Degussa, AG of Essen, Germany.

Approximately 18% of isobornyl acrylate (SR506), 29% 2-phenoxyethyl acrylate and 10% dibasic ester solvent are mixed together. The temperature during mixing should not exceed approximately 150° F. While the mixture is still being agitated, approximately 13% of CPR-9000 styrene acrylate copolymer are mixed until the copolymer is dissolved. After the copolymer is dissolved, approximately 9% of a blue U.V. dispersion is added into the mixture for colorant. A photo initiator solution is added to form a curable ink composition. Additives such as Cognis 3250, are added to provide pigment stability. Tego 2250 is also added to enable the ink to wet out on its substrate and give the surface of the ink mar resistance.

EXAMPLE 8

In this example, a UV curable ink having the following formulation was made:

| | |
|---|---|
| 30-40% | Acrylic Solution |
| 43.50% | M-8200/2-Phenoxyethyl Acrylate[1] |
| 37.50% | M-2000-Vinylcaprolactame[2] |
| 1.50% | Z-4500 ST-1 Firstcure Polymerization Inhibitor (stabilizer)[3] |
| 17.50% | MB-2594 Acrylic Resin[8] |
| 100.00% | |
| 30.37% | Initiator Solution |
| 62.70% | IBOA (Isobornylacrylate)[1] |
| 0.70% | Z-4500 ST-1 Firstcure Polymerization Inhibitor (stabilizer)[3] |
| 8.60% | ITX (Isopropylthioxanthone)[4] |
| 6.00% | Irgacure 369 (Aminoketone)[5] |
| 10.00% | Irgacure 184 (Hydroxyketone)[5] |
| 12.00% | Ethyl-4 (Dimethylano) Benzoate[4] |
| 100.00% | |
| 10.00% | Vinyl caprolactam[2] |
| 18.00% | Blue Dispersion[7] |
| .80% | Z-4500 ST-1 Firstcure Polymerization Inhibitor (stabilizer)[3] |
| 1.00% | Ebercryl 381 Additive[6] |
| 100.00% | |

[1]From Sartomer Company, Inc. of Exton, Pennsylvania.
[2]From Base Corporation of Mount Olive, New Jersey
[3]From Eliokem of France.
[4]From Albemarle Corporation of Baton Rouge, Louisiana.
[5]From Ciba Specialty Chemicals Corporation of Basil, Switzerland.
[6]From Cytec Industries Inc. of West Paterson, New Jersey.
[7]RJH Dispersions
[8]Dianal America, Inc. of Pasadena, Texas.

Approximately 43.50% of 2-Phenoxyethylacrylate, 37.50% of vinylcaprolactame, and 1.50% of stabilizer were mixed together. While mixing, MB-2823 Acrylic Resin was added at a temperature not exceeding 130° F.

The photo initiator solution was made by initially mixing 62.70% Isobornylacrylate, 0.70% First cure ST-I Polymerization Inhibitor. While mixing the Isobornylacrylate and the stabilizer, Isopropylthioxanthone, and Irgacure 369 (6%), Irgacure 184 (10.00%) and 12.00% Ethyl-4 (Dimethylano) Benzoate were added. The mixture was mixed until dissolved.

The acrylic solution and the initiator solution were mixed together along with 10.00% vinylcaprolactame, 18.00% Blue Dispersion, 0.80% Stabilizer and 1.00% Ebercryl 381. The amount of acrylic solution and initiator solution will vary depending upon the amount of Blue Dispersion used. The Blue Dispersion will vary depending on the color intensity desired in the formulation. The initiator solution is varied depending on the amount of cure desired.

EXAMPLE 9

In this example, a UV curable ink having the following formulation was made:

| | |
|---|---|
| 40.00% | Acrylic Solution |
| 43.50% | M-8200/2-Phenoxyethyl Acrylate[1] |
| 37.50% | M-2000-Vinylcaprolactame[2] |
| 1.50% | First cure ST-I Polymerization Inhibitor (stabilizer)[3] |
| 17.50% | MB-2823 Acrylic Resin[8] (Acid # 0) |
| 100.00% | |
| 35.0% | Initiator Solution |
| 62.70% | IBOA (Isobornylacrylate)[1] |
| 0.70% | First cure ST-I Polymerization Inhibitor (stabilizer)[3] |
| 8.60% | ITX (Isopropylthioxanthone)[4] |
| 6.00% | Irgacure 369 (Aminoketone)[5] |
| 10.00% | Benzyl Dimethyl Ketal[5] |
| 12.00% | Ethyl-4 (Dimethylano) Benzoate[4] |
| 100.00% | |
| 10.00% | CN-131 Low Viscosity Aromatic Monoacrylate Oligomer[1] |
| 14.00% | D3010K Black Dispersion[7] |
| 1.00% | Ebercryl 381 Additive[6] |
| 100.00% | |

[1]From Sartomer Company, Inc. of Exton, Pennsylvania.
[2]From Base Corporation of Mount Olive, New Jersey
[3]From Eliokem of France.
[4]From Albemarle Corporation of Baton Rouge, Louisiana.
[5]From Ciba Specialty Chemicals Corporation of Basil, Switzerland.
[6]From Cytec Industries Inc. of West Paterson, New Jersey.
[7]RJH Dispersions
[8]Dianal America, Inc. of Pasadena, Texas.

Approximately 43.50% of 2-Phenoxyethylacrylate, 37.00% of vinylcaprolactame, and 1.50% of stabilizer were mixed together. While mixing, MB-2823 Acrylic Resin was added at a temperature not exceeding 130° F.

The photo initiator solution was made by initially mixing 62.70% Isobornylacrylate, 0.70% First cure ST-I Polymerization Inhibitor. While mixing the Isobornylacrylate and the stabilizer, Isopropylthioxanthone, and Irgacure 369 10.00% Benzyl Dimethyl Ketal and 12.00% Ethyl-4 (Dimethylano) Benzoate were added. The mixture was mixed until dissolved.

The acrylic solution and the initiator solution were mixed together along with 10.00% CN-131, 14.00% of the Black Dispersion and 1.00% of Ebercryl 381.

EXAMPLE 10

In this example, UV curable ink having the following formulation was made:

| | |
|---|---|
| 40.00% | Acrylic Solution |
| 42.00% | M-8200/2-Phenoxyethyl Acrylate[1] |
| 37.00% | M-2000-Vinylcaprolactame[2] |
| 1.00% | First cure ST-I Polymerization Inhibitor (stabilizer)[3] |
| 20.00% | MB-2594 Dianyl Acrylic Resin[8] (Acid # 6) |
| 100.00% | |
| 35.0% | Initiator Solution |
| 62.70% | IBOA (Isobornylacrylate) |
| 0.70% | First Cure ST-I Polymerization Inhibitor (stabilizer)[3] |
| 8.60% | ITX (Isopropylthioxanthone)[4] |
| 6.00% | Irgacure 369 (Aminoketone)[5] |
| 10.00% | Benzyl Dimethyl Ketal[5] |
| 12.00% | Ethyl-4 (Dimethylano) Benzoate[4] |
| 100.00% | |
| 10.00% | CN-131 Low Viscosity Aromatic Monoacrylate Oligomer[1] |
| 14.00% | D3010K Black Dispersion[7] |
| 1.00% | Ebercryl 381 Additive[6] |

[1]From Sartomer Company, Inc. of Exton, Pennsylvania.
[2]From Base Corporation of Mount Olive, New Jersey
[3]From Eliokem of France.
[4]From Albemarle Corporation of Baton Rouge, Louisiana.
[5]From Ciba Specialty Chemicals Corporation of Basil, Switzerland.
[6]From Cytec Industries Inc. of West Paterson, New Jersey.
[7]RJH Dispersions -continued

[8]Dianal American, Inc. of Pasadena, Texas.

Approximately 42.00% 2-Phenoxyethyl Acrylate, 37.00% Vinylcaprolactame, and 1.00% of stabilizer were mixed together. While mixing, MB-2590 Dianyl Acrylic Resin was added at a temperature not exceed 130° F. The photo initiator solution was made according to the procedure of claim 9.

The acrylic solution and the initiator solution were mixed together along with 10.00% CN-131, 14.00% of the Black Dispersion, and 1.00% of Ebercryl 381.

EXAMPLE 11

In this example, UV curable ink having the following formulation was made:

| | |
|---|---|
| 40.00% | Acrylic Solution |
| 41.50% | M-8200/2-Phenoxyethyl Acrylate[1] |
| 37.00% | N-Vinylpyrollolidone[9] |
| 1.50% | Genorad 16 (stabilizer)[2] |
| 20.00% | MB-2823 Acrylic Resin[8] (Acid # 0) |
| 100.00% | |
| 35.0% | Initiator Solution |
| 62.70% | IBOA (Isobornylacrylate)[1] |
| 0.70% | First Cure ST-I Polymerization Inhibitor (stabilizer)[3] |
| 8.60% | ITX (Isopropylthioxanthone)[4] |
| 6.00% | Irgacure 369 (Aminoketone)[5] |
| 10.00% | Benzyl Dimethyl Ketal[5] |
| 12.00% | Ethyl-4 (Dimethylano) Benzoate[4] |
| 100.00% | |
| 10.00% | CN-131 Low Viscosity Aromatic Monoacrylate Oligomer[1] |
| 14.00% | D3010K Black Dispersion[7] |
| 1.00% | Ebercryl 381 Additive[6] |

[1]From Sartomer Company, Inc. of Exton, Pennsylvania.
[2]From Rahn A.G., Switzerland
[3]From Eliokem of France.
[4]From Albemarle Corporation of Baton Rouge, Louisiana.
[5]From Ciba Specialty Chemicals Corporation of Basil, Switzerland.
[6]From Cytec Industries Inc. of West Paterson, New Jersey.
[7]From RJH Dispersions
[8]From Dianal America, Inc. of Pasadena, Texas.
[9]From ISP Chemicals Inc. of Wayne, New Jersey.

Approximately 41.50% of 2-Phenoxyethyl Acrylate, 37.00% of N-Vinylpyrollolidone, and 1.50% of stabilizer were mixed together. While mixing, MB-2823 Acrylic Resin was added at a temperature not exceeding 130° C. The photo initiator solution was made according to the procedure of claim 9.

The acrylic solution and the initiator solution were mixed together along with 10.00% CN-131, 14.00% of the Black Dispersion, and 1.00% of Ebercryl 381.

Although the present invention has been described with reference to preferred embodiments, workers skilled in the art will recognize that changes may be made in form and detail without departing from the spirit and scope of the invention.

What is claimed is:

1. An ink composition for printing an ink image onto a plastic substrate comprising:
    a pigment, a diluents, a mono-functional monomer and an acrylic polymer or copolymer having an acid number below 20 wherein the composition is characterized by long term pigment suspension,
    wherein the ink composition when cured is capable of continuous elongation by 100% to 900% during thermal processing of the plastic substrate which results in stretching of the substrate.

2. The ink composition of claim 1 wherein the monomer includes 2 phenoxyethyl acrylate, isopropyl acrylate, ethyl methacrylate, butyl methacrylate, methyl methacrylate, or any combination of any of these.

3. The ink composition of claim 1 wherein the mono-functional monomer is polymerizable to a molecular weight of up to 25,000 g/mole.

4. The ink composition of claim 1 wherein the acrylic polymer or copolymer includes butyl methacrylate, methyl methacrylate, ethyl methacrylate or copolymers thereof in any combination.

5. The composition of claim 1 wherein the mono-functional monomer includes an aromatic monoacrylate.

6. A method of forming an ink image on a plastic substrate comprising:
    depositing an ink composition onto a surface of the plastic substrate, the ink composition comprising a pigment, a mono-functional monomer and an acrylic polymer or copolymer having an acid number below 20, a diluent and a solvent;
    curing the ink composition on the plastic substrate to form a cured ink composition, wherein curing bonds the ink composition to the plastic substrate; and
    thermally forming the plastic substrate to form an ink image bonded onto the plastic substrate, wherein the thermal forming results in the stretching of at least a portion of the plastic substrate, further resulting in the continuous elongation of at least a portion of the ink image by 100% to 900%.

7. The method of claim 6 wherein the acrylic polymer or copolymer comprises ethyl methacrylate, butyl methacrytate, methyl methacrylate, or copolymers thereof in any combination.

8. The method of claim 7 wherein the mono-functional monomer includes an aromatic monoacrylate.

9. A method of printing an ink image onto a plastic substrate comprising:
    printing an ink composition onto a surface of a plastic substrate, the ink composition comprising a pigment, a mono-functional acrylate, an acrylic polymer or copolymer having an acid number below 20, a diluent, and a photoinitiator;
    curing the ink composition on the plastic substrate, wherein curing bonds the ink composition to the plastic substrate; and
    vacuum forming the plastic substrate to form an ink image bonded to the surface of the plastic substrate, wherein the vacuum forming results in the stretching of at least a portion of the plastic substrate, further resulting in the continuous elongation of at least a portion of the ink image by 100% to 900%.

10. The method of claim 9 wherein the ink composition is printed through at least one ink head at a temperature of about 120 to 160° F.

11. The method of claim 10 wherein the ink composition is printed through at least one printer nozzle ranging from about 27 to about 52 microns in size.

12. The method of claim 9 wherein curing comprises exposing the ink composition to ultraviolet energy, light emitting diode energy, or any combination of any of these.

13. An ink composition for digital printing onto a plastic substrate comprising:

a diluent, an acrylic polymer or copolymer, a pigment, a photoinitiator, and a mono-functional acrylate, wherein the ink composition when cured is capable of continuous elongation by 100% to 900% during thermal processing of the plastic substrate which results in stretching of the substrate.

14. The in composition of claim 13 wherein the acrylic polymer or copolymer comprises ethyl methacrylate, butyl methacrylate, methyl methacrylate or any combination thereof.

15. An ink jet printing system for digital printing onto a surface of a plastic substrate comprising:

an inkjet printer and a curable ink composition comprising a solvent or a diluent, a pigment, a mono-functional monomer and an acrylic polymer or copolymer having an acid number below 20, wherein the ink composition when cured is capable of continuous elongation by 100% to 900% during thermal processing of the plastic substrate which results in stretching of the substrate.

16. The ink jet printing system of claim 15 and further comprising:

a photo-initiator, and wherein the ink composition is capable of being cured by UV energy or LED energy.

17. A method of forming an ink composition for use in digital printing onto a surface of a plastic substrate, the method comprising:

blending a solvent or a diluent, a mono-functional monomer and an acrylate polymer or copolymer having an acid number below 20 to form an uncolored mixture;

mixing the uncolored mixture with a pigment, to form the ink composition, wherein the ink composition when cured is capable of continuous elongation by 100% to 900% during thermal processing of the plastic substrate which results in stretching of the substrate.

18. The method of claim 17 and further including a photo-initiator.

19. The method of claim 17 and further including printing the ink composition onto a plastic substrate.

20. The method of claim 19 wherein the printed ink composition is cured by solvent evaporation.

21. The method of claim 18 and further including printing the ink composition onto a plastic substrate.

22. The method of claim 21 wherein the printed ink composition is cured by LED energy or by UV energy.

23. A digitally printed ink image comprising:

an ink image deposited onto a surface of a plastic substrate, the ink image comprising a reaction product of an ink composition comprising a pigment, a diluents, an acrylic polymer or copolymer having an acid number below 20, a mono-functional monomer and a solvent, wherein the ink image when cured is capable of continuous elongation by 100% to 900% during thermal processing of the plastic substrate which results in stretching of the substrate.

24. The ink image of claim 23 wherein the plastic substrate comprises acrylonitrile butadiene styrene, styrenes, polystyrenes, cast acrylics, extruded acrylics, polycarbonates, polyethylenes, polypropylenes, polyesters, co-extruded polyesters, glycolised polyester, amorphous polyethylene terephthalate, rigid vinyl's, polyvinyl chlorides or any combination of any of these.

25. The curable ink composition of claim 1 wherein the ink composition presents a viscosity ranging from about 20 to 60 centipoises at 25° C.

26. The curable ink composition of claim 1 wherein the ink composition comprises between about 15 to about 85% by weight of the mono-functional monomer, the mono-functional monomer being selected from the group consisting of 2-phenoxyethyl acrylate, isobornyl acrylate, ethyl methacrylate, butyl methacrylate, methyl methacrylate, or any combination of any of these.

27. The method of claim 6 wherein the ink composition comprises between about 15 to about 85% by weight of the mono-functional monomer, the mono-functional monomer being selected from the group consisting of 2-phenoxyethyl acrylate, isobornyl acrylate, ethyl methacrylate, butyl methacrylate, methyl methacrylate, or any combination of any of these.

28. The method of claim 6 wherein the ink composition is deposited onto the surface of the plastic substrate by printing through at least one printer nozzle of an ink jet printer ranging from about 27 to about 52 microns in size.

29. The method of claim 6 wherein the ink composition presents a viscosity ranging from about 20 to 60 centipoises at 25° C.

30. The method of claim 9 wherein the ink composition comprises between about 15 to about 85% by weight of the mono-functional acrylate, the mon-functional acrylate being selected from the group consisting of 2-phenoxyethyl acrylate, isobornyl acrylate, ethyl methacrylate, butyl methacrylate, methyl methacrylate, or any combination of any of these.

31. The method of claim 9 wherein the ink composition presents a viscosity ranging from about 20 to 60 centipoises at 25° C.

32. The curable ink composition of claim 13 wherein the ink composition presents a viscosity ranging from about 20 to 60 centipoises at 25° C.

33. The method of claim 13 wherein the ink composition comprises between about 15 to about 85% by weight of the mono-fictional monomer, the mono-functional monomer being selected from the group consisting of 2-phenoxyethyl acrylate, isobornyl acrylate, ethyl methacrylate, butyl methacrylate, methyl methacrylate, or any combination of any of these.

34. The composition of claim 13 wherein the mono-functional monomer includes an aromatic monoacrylate.

35. The inkjet printing system of claim 15 wherein the mono-functional monomer includes an aromatic monoacrylate.

36. The method of claim 17 wherein the mono-functional monomer includes an aromatic monoacrylate.

37. The ink image of claim 23 wherein the mono-functional monomer includes an aromatic monoacrylate.

* * * * *